(12) United States Patent
Wells et al.

(10) Patent No.: US 8,373,094 B2
(45) Date of Patent: Feb. 12, 2013

(54) SELF-ADJUSTING LINER ASSEMBLY FOR A CONSUMABLE ELECTRODE ARC-WELDING TORCH

(75) Inventors: Jeffrey G. Wells, Belle River (CA);
Kenneth K. Pratt, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 1433 days.

(21) Appl. No.: 11/715,715

(22) Filed: Mar. 8, 2007

(65) Prior Publication Data
US 2008/0217314 A1 Sep. 11, 2008

(51) Int. Cl.
*B23K 35/02* (2006.01)
(52) U.S. Cl. .................. 219/145.1; 219/137.51; 219/138
(58) Field of Classification Search ............... 219/125.1, 219/137.44, 137.51, 137.7, 138, 143; 901/42
See application file for complete search history.

(56) References Cited

U.S. PATENT DOCUMENTS

| | | | | |
|---|---|---|---|---|
| 2,270,767 A * | 1/1942 | Pjatz | ................................. | 219/89 |
| 2,863,983 A * | 12/1958 | Kane et al. | ...................... | 219/75 |
| 2,870,324 A | 1/1959 | Albert | | |
| 3,119,948 A * | 1/1964 | Baird | ............................ | 314/101 |
| 3,174,025 A * | 3/1965 | Johnson | ......................... | 219/75 |
| 3,321,607 A * | 5/1967 | Falcone et al. | .................. | 219/98 |
| 3,445,619 A * | 5/1969 | Kelemen | ........................ | 219/98 |
| 3,529,128 A * | 9/1970 | Cruz, Jr. | ..................... | 219/137.44 |
| 3,783,233 A * | 1/1974 | dal Molin | ................ | 219/137.61 |
| 3,909,585 A * | 9/1975 | Sanders et al. | ........... | 219/137.51 |
| 4,365,137 A * | 12/1982 | Tarasov et al. | ............ | 219/137.31 |
| 4,591,690 A | 5/1986 | Reijmersdal | | |
| 6,028,283 A * | 2/2000 | Brunken, Sr. | .................. | 219/75 |
| 6,297,472 B1 * | 10/2001 | Bong et al. | ............... | 219/125.12 |
| 2003/0062353 A1 | 4/2003 | Niemann et al. | | |
| 2008/0217314 A1 | 9/2008 | Wells et al. | | |

FOREIGN PATENT DOCUMENTS

| | | |
|---|---|---|
| CN | 1733410 | 2/2006 |
| CN | 1816410 | 8/2006 |
| EP | 0 142 898 | 5/1985 |
| EP | 2070629 | 6/2009 |
| JP | 59-13574 | 1/1984 |
| JP | 59013574 | 1/1984 |
| WO | WO 8001772 A * | 9/1980 |
| WO | 2005/021199 | 3/2005 |

OTHER PUBLICATIONS

International Search Report and Written Opinion dated Sep. 17, 2012 in PCT/US2012/040883.
English language abstract for JP59-13574.
English language abstract for CN1816410.
English language abstract for CN1733410.

\* cited by examiner

*Primary Examiner* — Tu B Hoang
*Assistant Examiner* — Thien S Tran
(74) *Attorney, Agent, or Firm* — Fildes & Outland, P.C.

(57) ABSTRACT

A self-adjusting liner assembly for a welding torch includes an elongated tubular main body having forward and rearward ends. An elongated tubular retainer including a shoulder is mountable in the main body. An elongated tubular piston including a shoulder cooperates with the retainer in a telescoping relationship in the main body. A resilient member is disposed in the main body and envelops a portion of the retainer and the piston. The resilient member urges the shoulders away from each other and the tubular piston toward the forward end of the main body.

17 Claims, 6 Drawing Sheets

SELF-ADJUSTING LINER ASSEMBLY FOR A CONSUMABLE ELECTRODE ARC-WELDING TORCH

TECHNICAL FIELD

This invention relates to liners for welding torches, and more particularly to a self-adjusting liner assembly for a welding torch.

BACKGROUND OF THE INVENTION

It is known in the art that a conventional welding torch includes a liner retainer installed into a distal end of the welding torch. A liner insert is inserted into a proximal end of the welding torch and secured to the liner retainer. Once the liner insert is secured to the liner retainer, the liner insert is cut to a predetermined size (e.g., about 0.1 centimeters to about 10 centimeters past the end of the welding torch) and electrode wire can be fed through an aperture in the liner retainer.

In such torches the liner may become unseated from the retainer due, for example, to expansion of the welding torch. Unseating of the liner may cause improper feeding of the electrode wire into a contact tip of the welding torch. This may also cause increased wear of the contact tip, leading to premature replacement of the contact tip.

SUMMARY OF THE INVENTION

The present invention provides a self-adjusting liner assembly that maintains proper liner position in a welding torch. The liner assembly utilizes a spring loaded mechanism that constantly pushes the liner forward into a retaining head, into which a contact tip is threaded. This ensures proper feeding of electrode wire into the contact tip and reduces contact tip wear where the wire enters the tip. The liner assembly also allows for passage of welding gas through the assembly.

More particularly, a self-adjusting liner assembly for a welding torch in accordance with the invention includes an elongated tubular main body having forward and rearward ends. An elongated tubular retainer including a shoulder is mountable in the main body. An elongated tubular piston including a shoulder cooperates with the retainer in a telescoping relationship in the main body. A resilient member is disposed in the main body and envelops a portion of the retainer and the piston. The resilient member urges the shoulders away from each other and urges the tubular piston toward the forward end of the main body.

The resilient member may be a spring. The shoulder of the tubular retainer may be disposed in the main body rearward end. The shoulder of the tubular piston may be urged toward the main body forward end. The liner assembly may further include a quick load liner, and the piston may include a recess at an end opposite the retainer for receiving an end of the quick load liner. The quick load liner may include a liner insert and a liner body connected to the liner insert, and the liner insert may be receivable in the recess of the piston. The retainer may include a recess opposite the piston, and an inlet liner may be receivable in the retainer recess. The liner assembly may also include another resilient member, and the tubular piston may include an inner seat. The another resilient member may be received within the piston and may engage the seat and an end of the retainer. The retainer may include at least one longitudinally extending gas passage extending through the shoulder of the retainer. The piston may include at least one longitudinally extending gas passage, the gas passage being defined as one of a longitudinally extending recess disposed on the periphery of the shoulder and a longitudinally extending aperture through the shoulder.

In another embodiment, a self-adjusting liner assembly for a welding torch in accordance with the invention includes an elongated tubular main body having forward and rearward ends and a central aperture extending from the forward end to the rearward end. The aperture includes a piston shoulder stop in the forward end and a retainer seat in the rearward end. An elongated tubular retainer including a shoulder is mountable in the aperture of the main body adjacent the retainer seat. The retainer includes at least one longitudinally extending gas passage extending through the shoulder. The liner assembly further includes an elongated tubular piston having a shoulder, an inner seat, and at least one longitudinally extending gas passage defined by a recess disposed on the periphery of the shoulder. The piston cooperates with the retainer in a telescoping relationship in the main body aperture such that an end of the retainer opposite the retainer shoulder is received in the piston. At least one spring is received within the tubular piston and engages the inner seat and the end of the retainer. Another spring is disposed in the main body aperture and envelops a portion of the retainer and the piston. The another spring engages the piston shoulder and the retainer shoulder, and urges the piston toward the forward end of the main body.

A welding torch in accordance with the invention includes an elongated tubular main body having forward and rearward ends and a central aperture extending from the forward end to the rearward end. The aperture includes a piston shoulder stop in the forward end and a retainer seat in the rearward end. The welding torch further includes a self-adjusting liner assembly having an elongated tubular piston received in the main body aperture and including a shoulder. An elongated tubular retainer having a shoulder is removably mounted in the main body aperture adjacent the retainer seat. The piston and the retainer cooperate in a telescoping relationship in the main body aperture. A resilient member disposed in the main body aperture envelops a portion of the retainer and the piston. The resilient member engages the piston shoulder and the retainer shoulder, and urges the piston toward the forward end of the main body. The welding torch also includes a gooseneck having first and second ends. The gooseneck first end is operatively connected to the forward end of the tubular main body. A contact tip assembly is mounted on the second end of the gooseneck.

In a specific embodiment of the welding torch, the retainer may include a threaded outer portion cooperable with the main body aperture for mounting the retainer in the aperture. The tubular piston may include an inner seat. The self-adjusting liner assembly may include at least one resilient member received within the piston that engages the seat and an end of the retainer. The retainer may include at least one longitudinally extending gas passage extending through the shoulder of the retainer. The piston may include at least one longitudinally extending gas passage therethrough.

The welding torch may also include a quick load liner, and the piston may include a recess adjacent the main body forward end. The quick load liner is insertable into the main body aperture at the main body forward end and receivable in the piston recess. The welding torch may further include a power pin having an inlet liner received therein. The power pin is mountable in the main body aperture at the main body rearward end, and the inlet liner is receivable in the retainer shoulder.

DETAILED DESCRIPTION OF THE INVENTION

Figure 1:
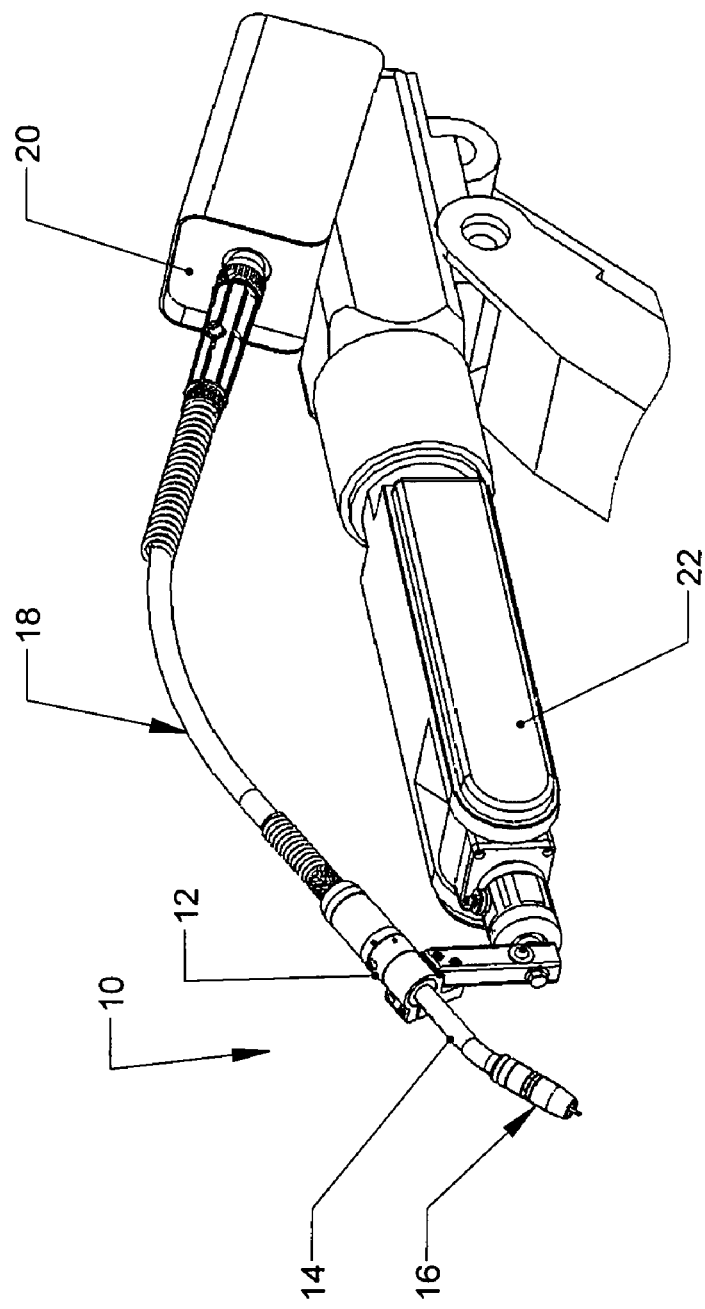
FIG. 1 is an environmental perspective view of a welding torch including a self-adjusting liner assembly mounted on a robotic arm.
Figure 2:
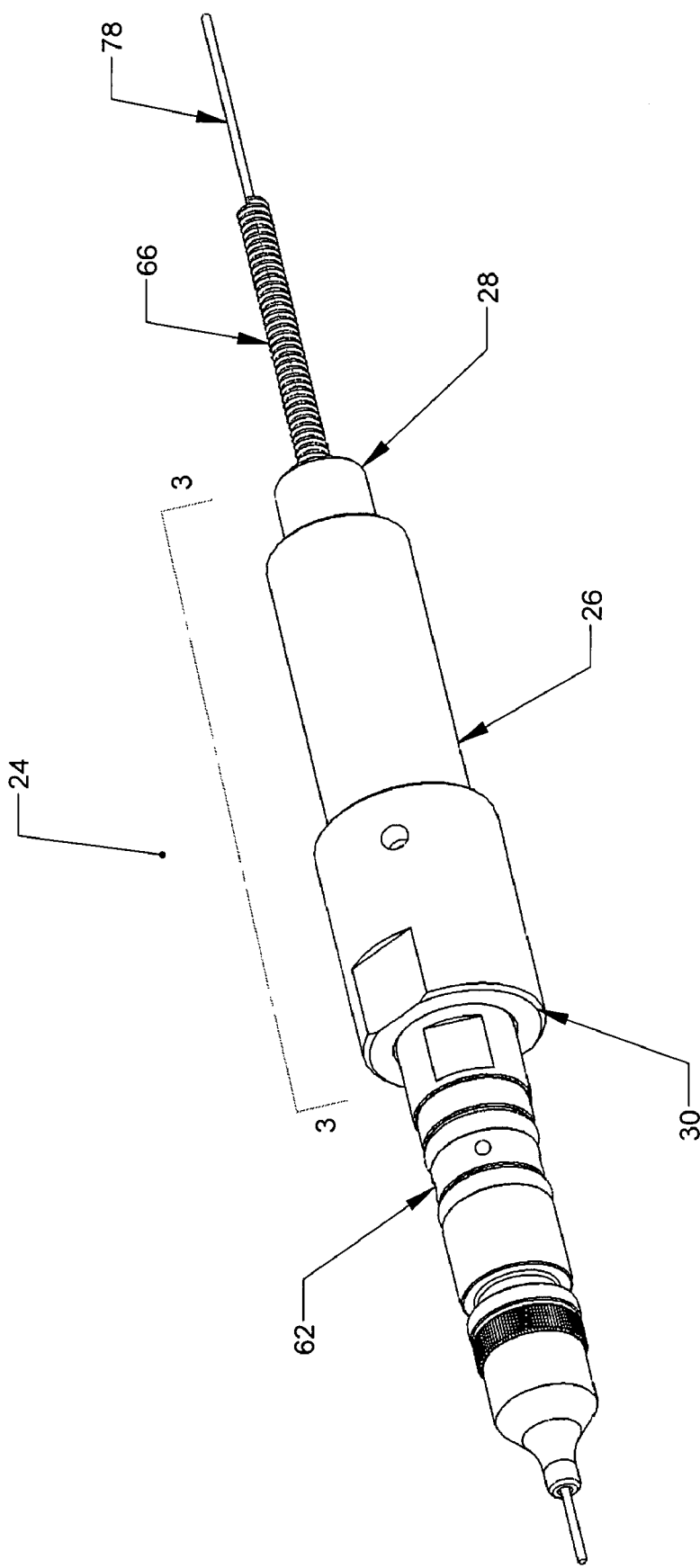
FIG. 2 is perspective view of the self-adjusting liner assembly and an associated power pin.
Figure 3:
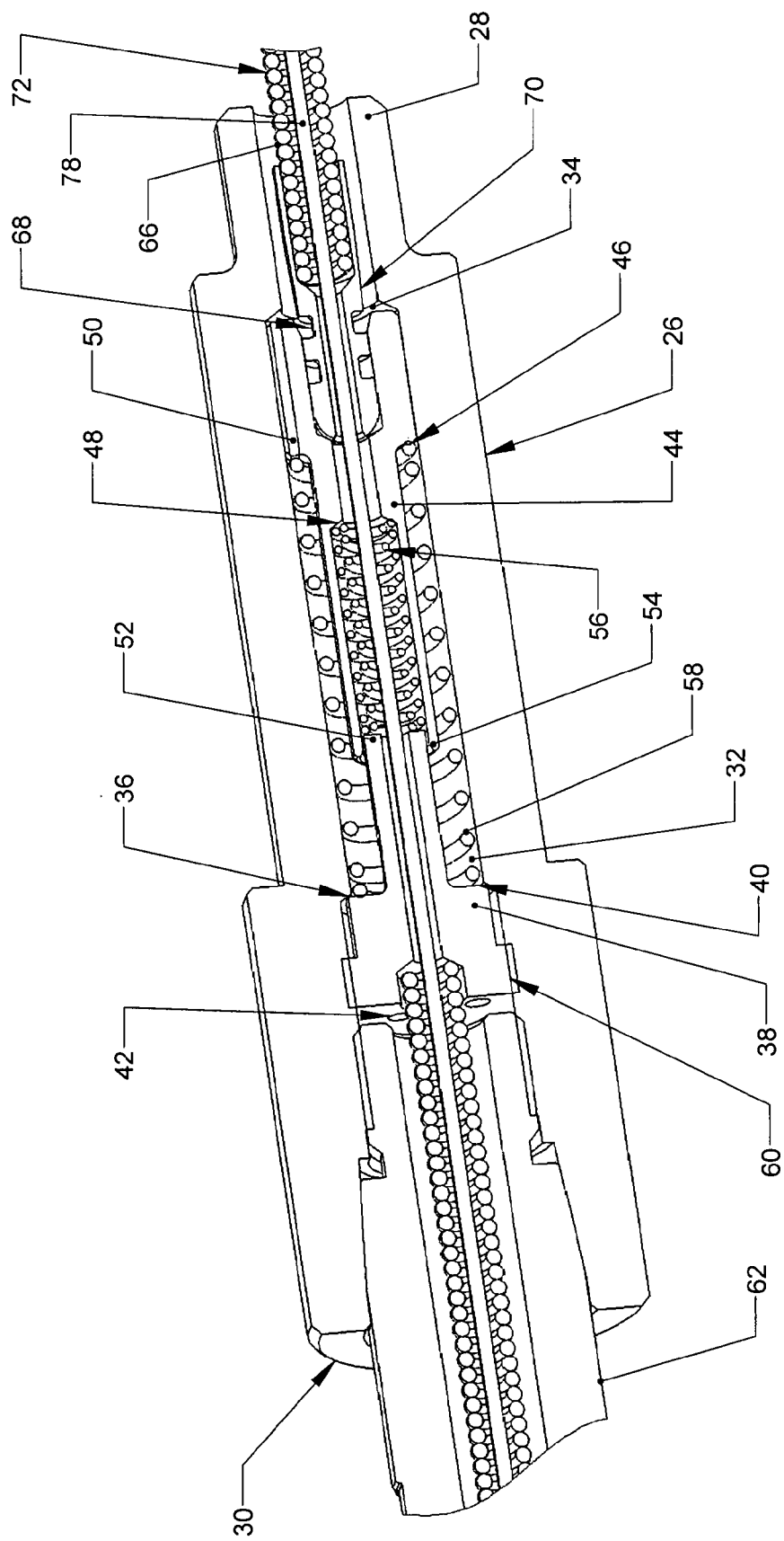
FIG. 3 is a cross-sectional view of the self-adjusting liner assembly and power pin taken along the line 3-3 in FIG. 2.
Figure 4:
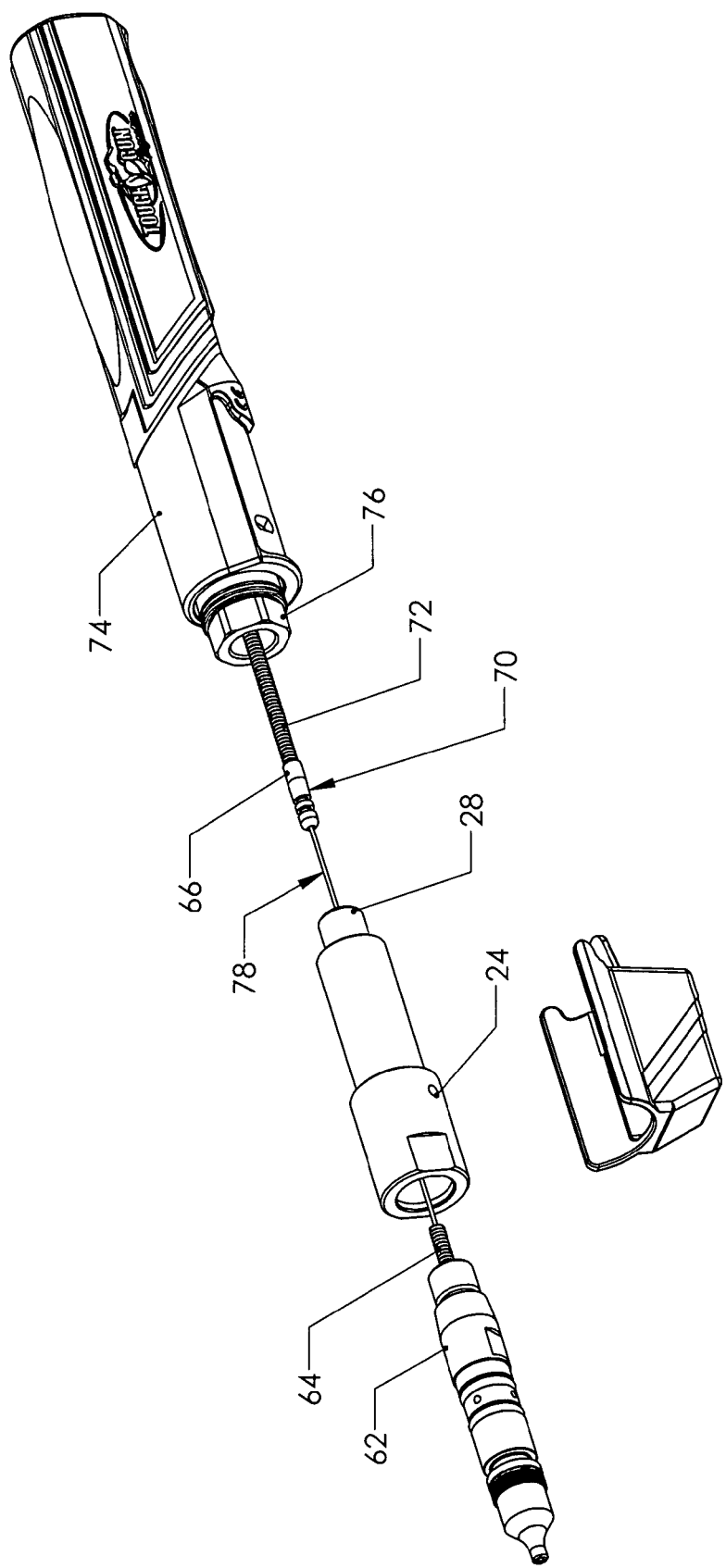
FIG. 4 is an exploded perspective view of a portion of the welding torch including the self-adjusting liner assembly.
Figure 5:
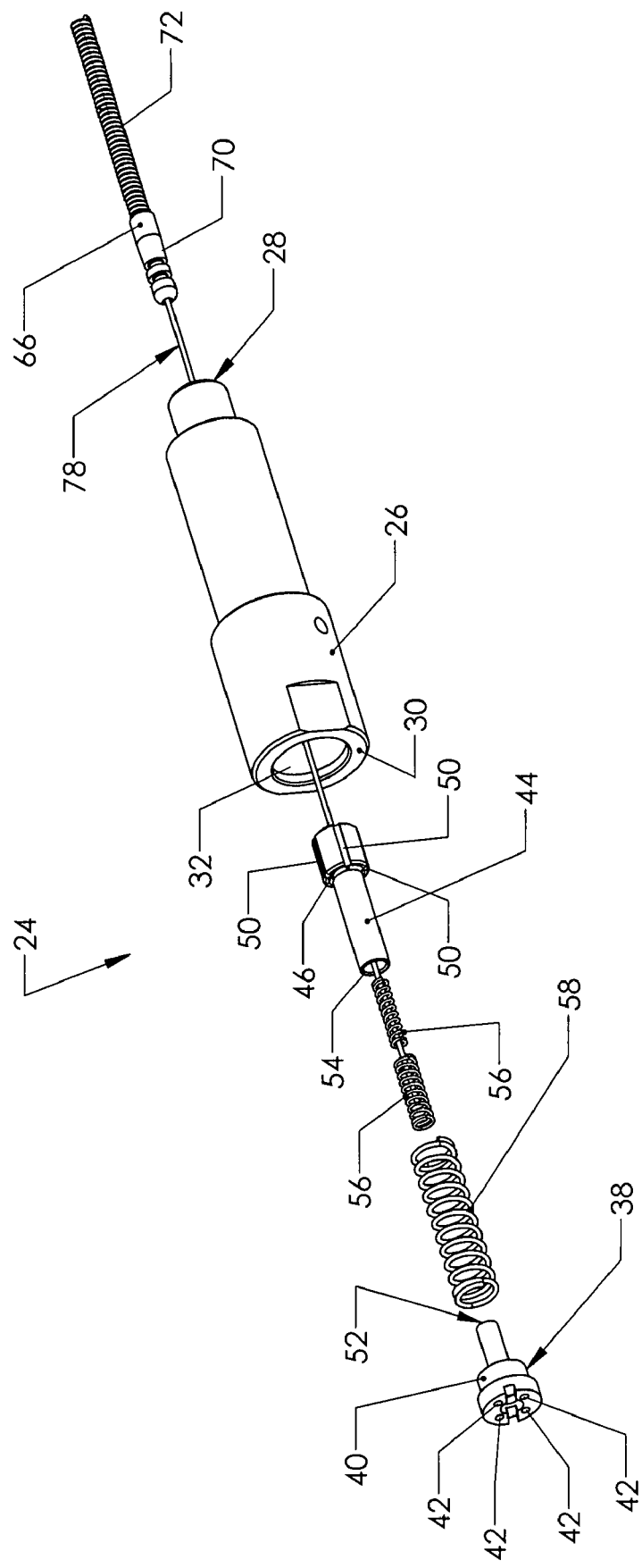
FIG. 5 is an exploded perspective view of the self-adjusting liner assembly.
Figure 6:
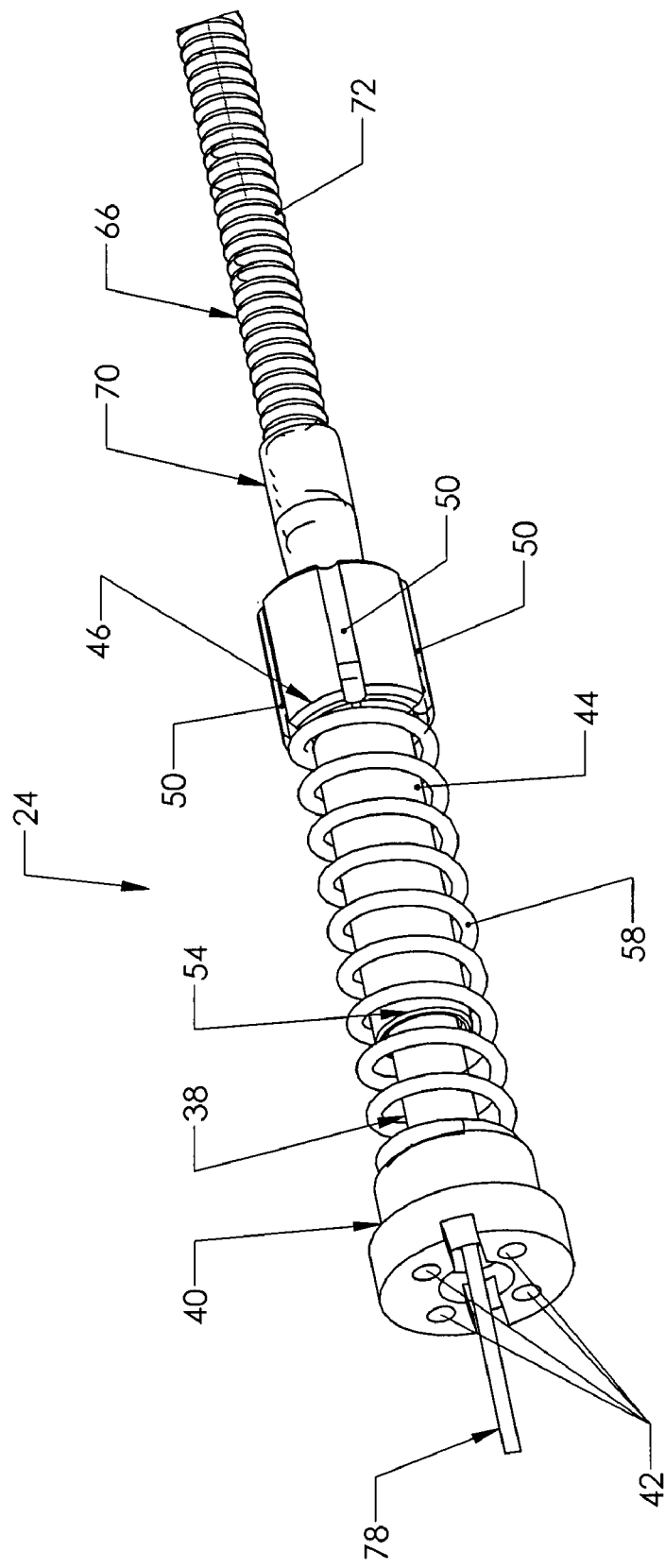
FIG. 6 is a perspective view of an inner portion of the self-adjusting liner assembly.

Referring now to the FIG. 1 in detail, numeral 10 generally indicates a welding torch such as a gas metal arc welding (GMAW) torch, a metal inert gas (MIG) torch, or similar welding torch. The welding torch 10 broadly includes a main housing 12, a gooseneck 14, and a contact tip assembly 16. A cable 18 is connected to a rearward end of the main housing 12 to supply gas, electrical current, and a consumable electrode (e.g., a metal welding wire) to the torch 10. The cable 18 may be connected to a wire feeder 20 opposite the main housing 12. The gooseneck 14 is operatively connected to a forward end of the main housing 12 and allows for the communication of the consumable electrode, the shielding gas, and the welding current to the contact tip assembly 16 mounted on the gooseneck. The welding torch 10 also may be mounted to a robotic arm 22.

The wire feeder 20 feeds the welding wire through the welding torch 10, and ultimately through an orifice in the contact tip assembly 16 at the forward end of the welding torch. The welding wire, when energized for welding, carries a high electrical potential. When the welding wire makes contact with target metal workpieces, an electrical circuit is completed and current flows through the welding wire, across the metal workpieces and to ground. The current causes the welding wire and the parent metal of the workpieces in contact with the welding wire to melt, thereby joining the workpieces as the melt solidifies.

With reference to FIGS. 2 through 6, the welding torch 10 includes a self-adjusting liner assembly 24 in accordance with the invention. The self-adjusting liner assembly 24 includes an elongated tubular main body 26 having a forward end 28, a rearward end 30, and a central aperture or through hole 32 extending from the forward end to the rearward end. The aperture 32 includes a piston shoulder stop 34 in the forward end 28 and a retainer seat 36 in the rearward end 30.

An elongated tubular retainer 38 including a shoulder 40 is mountable in the main body aperture 32 adjacent the retainer seat 36 such that the shoulder engages the retainer seat. The retainer shoulder 40 is generally disposed toward the rearward end 30 of the main body. The retainer 38 may have a threaded outer portion that is cooperable with the main body aperture 32 to allow the retainer to be threaded into the main body aperture 32, although other methods of mounting the retainer 38 are within the scope of the invention. The retainer 38 also includes at least one longitudinally extending gas passage 42 extending through the shoulder 40. In a specific embodiment, the retainer 38 includes four gas passages 42. It is possible, however, for the retainer to have more or fewer than four gas passages. The gas passage(s) 42 allow for the passage of shielding gas through the retainer 38.

The liner assembly 24 further includes an elongated tubular piston 44 including a shoulder 46, an inner seat 48, and at least one longitudinally extending gas passage 50 defined by one of a longitudinally extending recess disposed on the periphery of the shoulder 46 and a longitudinally extending aperture through the shoulder. In a specific embodiment, the piston 44 includes four gas passages 50. It is possible, however, for the piston to have more or fewer than four gas passages. The gas passage(s) 50 allow for the passage of shielding gas through the piston 44. The piston shoulder 46 is generally disposed toward the forward end 28 of the main body. The piston 44 cooperates with the retainer 38 in a telescoping relationship in the main body aperture 32. In other words, an end 52 of the retainer 38 opposite the retainer shoulder 40 is received in the tubular piston 44 at an end 54 of the piston opposite the piston shoulder 46, and the piston 44 is slidable about the retainer 38, varying the distance between the shoulders 40 and 46.

At least one resilient member 56 such as a spring or other resilient, compressible member is received within the tubular piston 44 and engages the inner seat 48 of the piston and the end 52 of the retainer 38. In a specific embodiment, the liner assembly 24 includes two concentrically disposed springs 56 within the tubular piston 44 such that one of the springs 56 has a smaller diameter than the other spring 56 and is disposed within the other spring. The spring(s) 56 support the welding wire within the piston 44 as the piston moves forward, which is described in more detail below.

Another resilient member 58 such as a spring or similar is disposed in the main body aperture 32. The resilient member 58 envelops a portion of the retainer 38 and the piston 44 between the retainer shoulder 40 and piston shoulder 46 and engages the retainer and piston shoulders 40, 46. The resilient member 58 urges the shoulders 40, 46 away from each other, causing the piston 44 to be urged toward the forward end 28 of the main body. When the piston 44 is fully extended, it engages the piston shoulder stop 34.

The retainer 38 may further include a recess 60 in the retainer shoulder 40 opposite the piston 44. The welding torch 10 may further include a power pin 62 having an inlet liner 64 received therein. The power pin 62 can be mounted in the main body aperture 32 at the main body rearward end 30. In a mounted disposition of the power pin 62, the inlet liner 64 is received in the recess 60 of the retainer 38.

The welding torch may also include a quick load liner 66. The quick load liner 66 provides a channel for the welding wire from the liner assembly 24 through the gooseneck 14 into the contact tip assembly 16. The piston 44 may include a recess 68 in the shoulder 46 generally adjacent the main body forward end 28 at an end of the piston 44 opposite the retainer 38 (i.e., the end opposite end 54 of piston 44). An end of the quick load liner 66 may be inserted into the main body aperture 32 at the main body forward end 28 and is receivable in the piston recess 68. In a specific embodiment, the quick load liner 66 may include liner insert 70 and a flexible liner body 72 connected to or integral with the liner insert 70. The liner body 72 may be a metal (e.g., aluminum) coil. In this embodiment, the liner insert 70 is inserted into the piston recess 68 and releasably secured therein.

Referring now to FIGS. 1 through 6, the self-adjusting liner assembly 24 is positioned at the rearward end of the welding torch 10. A rear handle 74 including a cable connector 76 may be connected to the main body forward end 28 intermediate the main body 26 and the gooseneck 14. The contact tip assembly 16 is connected to the forward end of the gooseneck 14 opposite the liner assembly 24 and rear handle 74. The quick load liner 66 is installed from the front of the welding torch 10. To install the liner 66, the contact tip assembly 16 (which may include a retaining head and contact tip) may be removed from the welding torch 10. The liner 66 is then inserted from the front of the welding torch 10 and fed into the welding torch. As the liner 66 is fed into the torch, the liner enters the main body aperture 32 from the gooseneck 14 and rear handle 74, and is received in the piston recess 68, causing the liner 66 to become engaged with the piston 44. The liner 66 is further urged into the torch to compress the resilient member 58 via piston 44, and then the liner is cut approximately ⅝ of an inch from the forward end of the gooseneck 14. The contact tip assembly 16 may then be reinstalled on the welding torch 10 at the forward end of the gooseneck 14.

At this time, the piston 44 generally fully compresses the resilient member 58, and the counterforce of the resilient member 58 urges the piston forward. The force the resilient member exerts on the piston maintains engagement of the piston with the liner insert 70 of the quick load liner 66 and engagement of the liner 66 in the contact tip assembly 16.

Welding wire 78 is fed through the welding torch 10 (for example, by wire feeder 20) from the rear of the torch to the forward end of the torch. As it is fed, the welding wire 78 passes through the inlet liner 64 of the power pin 62, the tubular retainer 38, the tubular piston 44 including inner resilient members 56, and the quick load liner 66 into the contact tip assembly 16. As the welding wire 78 passes through the liner assembly 24, the dual resilient members 56 inside the piston 44 support the welding wire and aid in preventing the wire from wandering or binding inside the liner assembly.

It is critical that the liner 66 is seated properly directly behind the contact tip of the contact tip assembly 16 at the front end of the torch 10 to reduce wear of the contact tip and to maintain proper feeding of the welding wire 78 into the contact tip. Advantageously, the self-adjusting liner assembly 24 constantly urges the liner 66 forward (via piston 44) into a mating seat in the contact tip assembly 16, ensuring that liner is properly positioned in the contact tip and that the welding wire 78 is properly fed into the contact tip. For example, as the welding torch 10 is operated, it expands over time due to the thermal expansion of the materials of torch body caused by the heat of the welding process. Also, if the liner 66 is made of plastic, gas and heat may cause the liner, especially the front portion in the contact tip assembly 16, to be consumed over time. Otherwise, if the liner 66 is made of metal or similar, the liner is not likely to be consumed. As the torch 10 expands and/or the liner 66 is consumed, the piston 44 advances forward in the main body aperture 32, thereby continually urging the liner 66 forward such that the front end of the liner 66 is properly seated in the contact tip assembly 16. In one embodiment, the piston 44 may be able to travel about one inch in the main body aperture 32 before contacting the piston shoulder stop 34. When the piston shoulder 46 becomes engaged with the piston shoulder stop 34, the piston 44 is in its fully extended position (e.g., see FIG. 3) and cannot move any farther forward. At this time, it may be necessary to replace the quick load liner 66 and recompress the resilient member 58.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A self-adjusting liner assembly for a welding torch comprising:
    a main body that is elongated and tubular and that has forward and rearward ends;
    a retainer that is elongated and tubular and includes a shoulder mountable in the main body;
    a piston member that is elongated and tubular and includes a shoulder, the piston member cooperating with the retainer in a telescoping relationship in the main body;
    a resilient member disposed in the main body, the resilient member enveloping a portion of the retainer and the piston member, the resilient member urging the shoulder of the retainer and the shoulder of the piston member away from each other and constantly urging the piston member toward the forward end of the main body;
    the retainer including a recess opposite the piston member; and
    an inlet liner receivable in the recess of the retainer, the inlet liner providing a channel through which welding wire passes.

2. The self-adjusting liner assembly of claim 1, wherein the resilient member is a spring.

3. The self-adjusting liner assembly of claim 1, wherein the shoulder of the retainer is disposed in the rearward end of the main body.

4. The self-adjusting liner assembly of claim 1, wherein the shoulder of the piston member is urged toward the forward end of the main body.

5. The self-adjusting liner assembly of claim 1, including a quick load liner and wherein the piston member includes a recess at an end opposite the retainer for receiving an end of the quick load liner.

6. The self-adjusting liner assembly of claim 5, wherein the quick load liner includes a liner insert and a liner body connected to the liner insert, the liner insert being receivable in the recess of the piston member.

7. The self-adjusting liner assembly of claim 1, including another resilient member and wherein the piston member includes an inner seat and the another resilient member is received within the piston member and engages the inner seat of the piston member and an end of the retainer, the another resilient member being concentric with the resilient member that envelopes the retainer and the piston member.

8. The self-adjusting liner assembly of claim 1, wherein the retainer includes at least one longitudinally extending gas passage extending through the shoulder of the retainer.

9. The self-adjusting liner assembly of claim 1, wherein the piston member includes at least one longitudinally extending gas passage, the gas passage being defined as one of a longitudinally extending recess disposed on the periphery of the shoulder of the piston member and a longitudinally extending aperture through the shoulder of the piston member.

10. A self-adjusting liner assembly for a welding torch comprising:
    a main body that is elongated and tubular and has forward and rearward ends and a central aperture extending from the forward end to the rearward end, the central aperture of the main body including a piston shoulder stop in the forward end of the main body and a retainer seat in the rearward end of the main body;
    a retainer that is elongated and tubular and includes a shoulder mountable in the central aperture of the main body adjacent the retainer seat; the retainer including at least one longitudinally extending gas passage extending through the shoulder of the retainer;
a piston member that is elongated and tubular and includes a shoulder, an inner seat, and at least one longitudinally extending gas passage defined by a recess disposed on the periphery of the shoulder of the piston member;
the piston member cooperating with the retainer in a telescoping relationship in the central aperture of the main body such that an end of the retainer opposite the shoulder of the retainer is received in the piston member;
at least one spring received within the piston member and engaging the inner seat of the piston member and the end of the retainer;
another spring disposed in the central aperture of the main body and enveloping a portion of the retainer and the piston member, the another spring engaging the shoulder of the piston member and the shoulder of the retainer and constantly urging the piston member toward the forward end of the main body, and the another spring being concentric with the spring that is received within the piston member;
the retainer including a recess opposite the piston member; and
an inlet liner receivable in the recess of the retainer, the inlet liner providing a channel through which welding wire passes.

11. A welding torch comprising:
a main body that is elongated and tubular and has forward and rearward ends and a central aperture extending from the forward end to the rearward end, the central aperture of the main body including a piston shoulder stop in the forward end of the main body and a retainer seat in the rearward end;
a self-adjusting liner assembly including:
  a piston member that is elongated and tubular and that is received in the central aperture of the main body, the piston member including a shoulder;
  a retainer that is elongated and tubular and has a shoulder, the retainer being removably mounted in the central aperture of the main body adjacent the retainer seat of the main body;
  the piston member and the retainer cooperating in a telescoping relationship in the central aperture of the main body;
  a resilient member disposed in the central aperture of the main body and enveloping a portion of the retainer and the piston member, the resilient member engaging the shoulder of the piston member and the shoulder of the retainer and constantly urging the piston member toward the forward end of the main body and into engagement with the piston shoulder stop in the central aperture of the main body; and
  a quick load liner;
  the piston member including a recess adjacent the forward end of the main body, the quick load liner being insertable into the central aperture of the main body at the forward end of the main body, the quick load liner being receivable in the recess of the piston member, the quick load liner providing a channel through which welding wire passes, and the resilient member maintaining engagement of the piston member with the quick load liner;
a gooseneck having first and second ends, the first end being operatively connected to the forward end of the main body; and
a contact tip assembly mounted on the second end of the gooseneck.

12. The welding torch of claim 11, wherein the retainer includes a threaded outer portion cooperable with the central aperture of the main body for mounting the retainer in the central aperture.

13. The welding torch of claim 11, wherein the piston member includes an inner seat and the self-adjusting liner assembly includes at least one resilient member received within the piston member and engaging the inner seat of the piston member and an end of the retainer.

14. The welding torch of claim 11, wherein the retainer includes at least one longitudinally extending gas passage extending through the shoulder of the retainer.

15. The welding torch of claim 11, wherein the piston member includes at least one longitudinally extending gas passage therethrough.

16. The welding torch of claim 11, including a power pin having an inlet liner received therein, the power pin being mountable in the central aperture of the main body at the rearward end of the main body, and the inlet liner being receivable in the shoulder of the retainer.

17. The self-adjusting liner assembly of claim 11, including another resilient member and wherein the piston member includes an inner seat and the another resilient member is received within the piston member and engages the inner seat of the piston member and an end of the retainer, the another resilient member being concentric with the resilient member that envelopes the retainer and the piston member.

* * * * *